Figure 1:
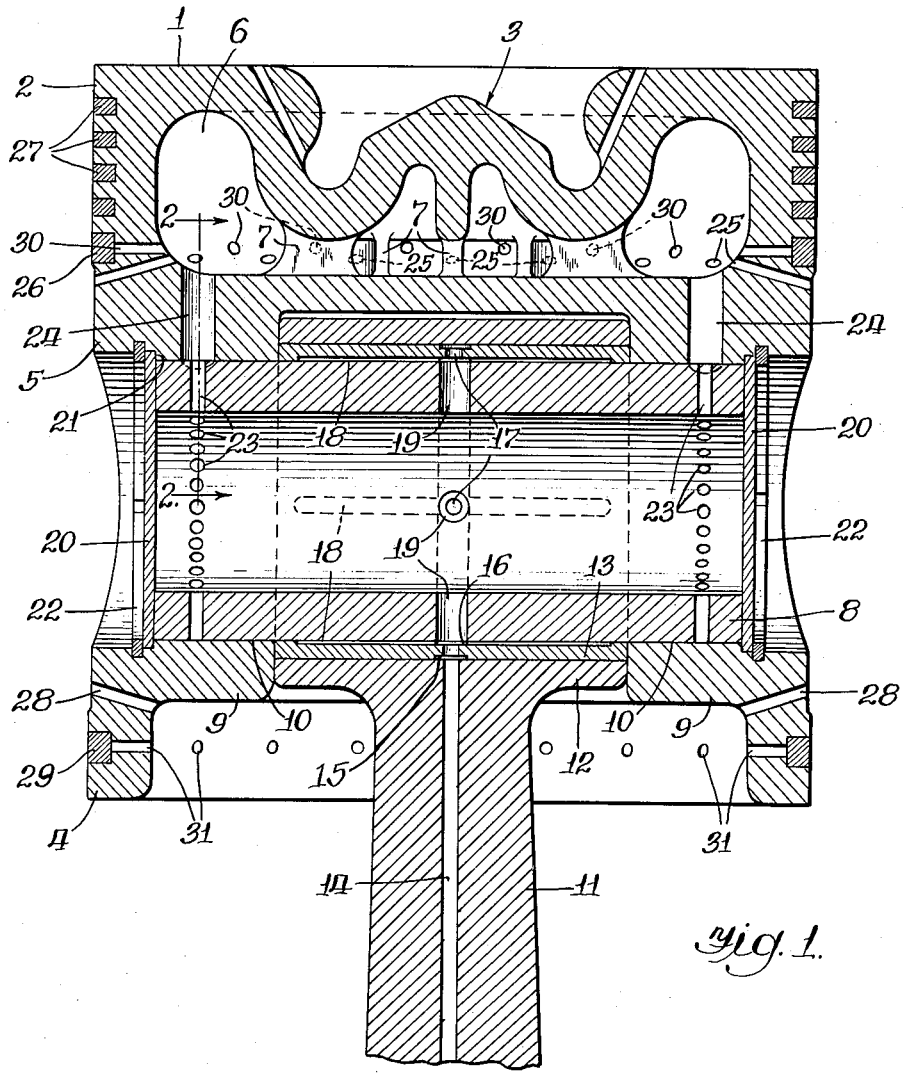

April 24, 1956   F. J. SMITH   2,742,883
OIL COOLED PISTON STRUCTURE
Filed July 15, 1953

INVENTOR.
Frank J. Smith
BY
Soans, Glaister & Anderson
Attys.

United States Patent Office 2,742,883
Patented Apr. 24, 1956

2,742,883
OIL COOLED PISTON STRUCTURE
Frank J. Smith, Chicago, Ill.

Application July 15, 1953, Serial No. 368,101

7 Claims. (Cl. 123—41.38)

This invention relates to oil cooled piston construction for internal combustion engines, and it is particularly adapted to use in diesel engines where high heat conditions are encountered, but it should be understood that the invention is generally applicable in any situation where it is desired to withdraw heat from the piston.

The main objects of the invention are to provide a relatively simple and practicable construction whereby lubricating oil of an internal combustion engine may be circulated in and around a piston to withdraw heat therefrom; to provide a structure which will not require the addition of a significant amount of oil to the normal supply of oil required in the engine; and to provide a generally improved oil cooled piston construction.

Other objects and advantages of the invention will be understood by reference to the following specification and the accompanying drawing (one sheet) wherein there is described and illustrated a selected embodiment of the invention.

Figure 2:
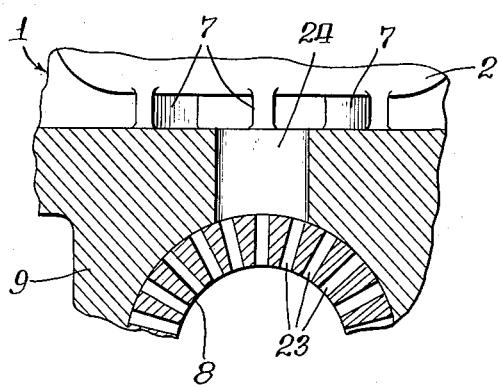

In the drawing,

Figure 1 is a vertical cross section through the axis of a piston and its connecting rod; and Figure 2 is a section on the line 2—2 of Figure 1.

In the drawing there is illustrated a piston 1 which is particularly designed for use in a diesel engine, the piston embodying certain features of construction shown and fully explained in my Patent No. 2,505,999 of May 2, 1950. This piston includes a closed head end portion 2 which is provided with a combustion controlling construction or formation 3 recessed into said head end in accordance with my said patent, an open skirt end portion 4, and a cylindrical intermediate wall portion 5 which integrally interconnects the head and skirt portions 2 and 4.

The combustion controlling structure 3 tends to cause the head end of the piston to absorb a large amount of heat. To withdraw such heat, a chamber 6 is provided in the head end of the piston in surrounding relation to said combustion controlling structure and oil is circulated through said chamber 6 to withdraw heat from the head end of the piston. This chamber 6 may be formed in the piston by means of sand cores during the casting of the piston. Circumferentially spaced supporting ribs 7 connect the central portions of the piston above and below the chamber 6 which comprises the outer enlarged circumferential portion and the central shallow connecting portion in which the ribs are located as shown.

A piston pin 8 is journaled in bearing formations 9 which extend inwardly from the intermediate cylindrical wall portion 5 of the piston, these bearing formations 9 being provided with suitable piston pin receiving bearing openings 10. A connecting rod 11 having the usual end bearing box 12 is journaled through the agency of a bearing bushing or sleeve 13 on a central portion of the wrist pin 8.

The connecting rod 11 is drilled longitudinally as shown at 14 to permit oil to be fed through the connecting rod toward the wrist pin in a known manner. The bearing sleeve 13 is fixed in the connecting rod as by being a drive fit therein and said sleeve is provided with external and internal circumferential grooves 15 and 16 respectively, which are interconnected by means of a plurality of radial passageways 17 in a sleeve.

The inside face of the bearing sleeve 13 is provided with longitudinally extending oil grooves 18 which communicate with the internal channel 16 to receive oil therefrom for lubricating the bearing. The piston pin or wrist pin 8 is provided with a plurality of radially extending passageways 19 which extend from the outside of the wrist pin to the inside thereof, the wrist pin being tubular as shown, so that oil delivered by the passageway 14 in the connecting rod will be delivered to the interior of the wrist pin.

The external circumferential groove 15 in the sleeve 13 provides for the flow of oil from the connecting rod passageway 14 through the opening 17 in the sleeve whether or not one of said openings is aligned with the connecting rod passageway 14. Similarly the internal circumferential groove 16 in the bearing sleeve insures the flow of oil from said groove through the passageways 19 in the wrist pin regardless of the rotative position of the wrist pin.

The ends of the tubular wrist pin are closed by suitable closure discs 20 which are seated against the ends of the wrist pin and on suitable seats 21 provided in the piston. Spring rings or clips 22 seated in grooves provided in the piston serve to hold the closures 20 in place.

Adjacent one or both of its ends, the wrist pin 8 is provided with a plurality of radially extending holes or passageways 23, these passageways being spaced circumferentially as best shown in Figure 2. Regardless of the rotative position of the wrist pin 8, one or more of the passageways 23 will be in communication with an opening or passageway 24 which constitutes an inlet opening to the cooling chamber 6 in the head end of the piston. The passageway 24 is made of such size, and the openings 23 are so spaced as to insure the desired communication between these passageways regardless of the rotative position of the wrist pin.

Present preferences are for the use of passageways 23 at one end only of the wrist pin but passageways 24 are preferably provided at both sides of the piston, in communication with the wrist pin bearing openings 10 so that the wrist pin may be positioned with its passageways 23 at either side of the piston thereby to avoid the necessity for special care in positioning the wrist pin in the piston.

It will be seen oil delivered to the interior of the wrist pin as already explained, will be forced outwardly through one or more of the passageways 23 into the inlet opening 24 which delivers the oil to the cooling chamber 6. From the cooling chamber 6, oil is permitted to escape through a plurality of outlet openings or ports 25 which extend from the chamber 6 to the outside of the piston, preferably communicating with a portion of the piston immediately below an oil ring 26 which is seated therein in the usual manner. Other rings are indicated at 27 in accordance with usual practice.

The central wall portion 5 of the piston is preferably slightly smaller in diameter than the upper and lower portions 2 and 4 so that when the piston is in place in a cylinder, a chamber will be provided between the piston and the cylinder wall around said intermediate portion 5 of the piston. Hence, oil delivered through the outlets 25 from the chamber 6 will be formed into a thin film surrounding the outside of the recessed piston wall portion 5 to insure adequate lubrication between the piston and the cylinder in which the piston operates. From this latter chamber, the oil will be permitted to escape through a plurality of passageways 28 which extend from the lower portion of the recessed wall area to the inside of the skirt portion of the piston.

The skirt of the piston is provided with the usual ring 29 and a plurality of oil passageways 30 and 31 are provided from the ring recesses for the rings 26 and 29 respectively, to the oil chamber 6 and to the inside of the skirt 4 respectively as shown.

Oil circulated through the piston chamber 6 in the manner above described, will have an important effect in absorbing heat from the piston to thereby attain increased efficiency in engine operation.

Various changes in the details of construction as explained may be made while retaining the principles of the invention.

I claim:

1. The combination of a piston having a closed head end and an open skirt end, said head and skirt ends having sides provided with piston ring receiving grooves, and an intermediate portion having its outer surface slightly recessed relative to said head and skirt sides and extending into close proximity to the respectively adjacent grooves in said head and skirt end portions, the piston also being provided with wrist pin receiving openings aligned diametrically of the piston and a closed chamber in said head end, an inlet passageway interconnecting said chamber and one of said wrist pin receiving openings, and an opening extending from said chamber to said recessed intermediate side wall surface portion, a tubular wrist pin seated in said wrist pin receiving openings and having a passageway extending from the inside of the wrist pin to the outside thereof into communication with said inlet passageway, a connecting rod journaled on said wrist pin, said connecting rod and wrist pin being provided with communicating openings whereby oil is movable through said connecting rod into said wrist pin, thence through said inlet passageway into said chamber and from said chamber to said slightly recessed intermediate outer surface portion of the piston.

2. The combination of a piston comprising a cylinder having a closed head end and an open skirt end, upper and lower cylinder bearing side wall outer surface portions, and an intermediate side wall outer surface portion recessed relative to said upper and lower side wall surface portions, the piston being provided with wrist pin receiving openings aligned diametrically of the piston and having a chamber in said head end, an inlet opening interconnecting said chamber and one of said wrist pin receiving openings, an opening extending from said chamber to said recessed intermediate side wall surface portion, and a relief opening extending through the side wall of the piston from a portion of said recessed surface thereof adjacent the open skirt end of the piston to the inside thereof, a tubular wrist pin seated in said wrist pin receiving openings and having a passageway extending from the inside of the wrist pin to the outside thereof into communication with said inlet opening, a connecting rod journaled on said wrist pin, said connecting rod and wrist pin being provided with communicating openings whereby oil is movable through said connecting rod into said wrist pin, thence through said inlet opening into said chamber and from said chamber to said recessed outer cylindrical surface of the piston and through said relief opening to the interior of the piston.

3. The combination of a piston, a hollow wrist pin journaled in said piston and having closed ends, a connecting rod journaled on said wrist pin, said piston having a closed head end, an open skirt end, and a cylindrical wall portion intermediate and connecting said head and skirt ends, the outside surface of said intermediate wall portion being recessed relative to the outside side wall surfaces of said end portions of the piston, a closed chamber within said head end, wrist pin receiving openings in diametrically opposed portions of said intermediate wall portion of the piston, an inlet passageway interconnecting one of said wrist pin receiving openings with said chamber, an outlet passageway extending from said chamber to the outside of said recessed intermediate wall surface of the piston, said wrist pin being provided with a plurality of circumferentially spaced holes extending from the inside of said wrist pin to the outside thereof in position to communicate with said inlet passageway, said inlet passageway being of such transverse size and the spacing of said circumferentially spaced holes being such that at least one of the latter will be in communication with said inlet passageway in all rotative positions of said wrist pin, and said piston having a relief opening extending from the said recessed intermediate wall surface adjacent the skirt end of the piston to the interior of the piston, said connecting rod and wrist pin being provided with communicating openings through which oil is movable into the inside of said tubular wrist pin, the oil being also movable from within said wrist pin through at least one of said circumferentially spaced holes and said inlet passageway into said chamber, thence through said outlet passageway to the outside of said piston, and thence through said relief opening to the interior of the piston.

4. The combination of a piston having a closed head end and an open skirt end, said head and skirt ends having sides provided with piston ring receiving grooves, and a wall portion intermediate said head and skirt portions having its outer surface slightly recessed relative to said head and skirt sides and extending into close proximity to the respectively adjacent grooves in said head and skirt end portions, the piston also being provided with wrist pin receiving openings aligned diametrically of the piston, a closed chamber in said head end, and inlet passageway interconnecting said chamber and one of said wrist pin receiving openings, and an opening extending from said chamber to said recessed intermediate side wall surface portion, a wrist pin seated in said wrist pin receiving openings and having a passageway therein communicating with said inlet passageway, a connecting rod journalled on said wrist pin, said connecting rod being provided with a passageway communicating with said wrist pin passageway, whereby oil is movable through said connecting rod and wrist pin, thence through said inlet passageway into said chamber and from said chamber to said slightly recessed intermediate outer surface portion of the piston, and said piston being further provided with a passageway extending from said recessed intermediate surface portion to the inside of said skirt end portion of the piston for relieving oil from the space surrounding said recessed surface when the piston is in operative position in a cylinder.

5. The combination of a piston having a closed head end and an open skirt end, said head and skirt ends having sides provided with piston ring receiving grooves and a wall portion intermediate said head and skirt ends and having its outer surface slightly recessed relative to said head and skirt sides, the piston also being provided with wrist pin receiving openings aligned diametrically of the piston, a closed chamber in said head end, an inlet passageway interconnecting said chamber and one of said wrist pin receiving openings, and an opening extending from said chamber to said recessed intermediate wall portion, a tubular wrist pin seated in said wrist pin receiving openings and having a plurality of circumferentially spaced holes extending from the inside of the wrist pin to the outside thereof, said inlet passageway being of such transverse size and the spacing of said holes being such that at least one of the latter will be in communication with said passageway in all rotative positions of said wrist pin, a connecting rod journalled on said wrist pin, said connecting rod and wrist pin being provided with communicating openings whereby oil is movable through said connecting rod into said wrist pin, thence through said inlet passageway into said chamber and from said chamber to said slightly recessed, intermediate, outer surface portion of the piston, and said piston being further provided with a passageway extending from said recessed, intermediate surface portion to the inside of said skirt end portion of the piston for relieving oil from the space surrounding said recessed surface when the piston is in operative position in a cylinder.

6. The combination of a reciprocable piston, a connecting rod and a wrist pin pivotally connecting said connecting rod to said piston for reciprocating the latter, the piston having a head end provided with a permanent, wholly enclosed chamber of fixed size and having a side wall provided with at least one external groove adjacent said head end for receiving a piston ring, said connecting rod, wrist pin and piston having openings therein in communication with each other and with said chamber in all positions of reciprocation of said piston and operative to conduct lubricant from said connecting rod into said chamber, and said piston being further provided with a plurality of passageways which extend outwardly from said chamber to the outside of the side wall of the piston adjacent to but below said groove for conducting lubricant from said chamber to the outside of the side wall of the piston, the outer ends of said plurality of passageways being spaced around the circumference of said piston so as to facilitate the formation of a continuous film of lubricant around the entire circumference of the piston side wall when the piston is actuated in a cylinder.

7. The combination of a reciprocable piston, a wrist pin seated in said piston, a connecting rod pivotally connected to said piston through the agency of said wrist pin for reciprocating said piston, said piston having a head end provided with a permanent, wholly enclosed chamber of fixed size and having a side wall provided with at least one piston ring groove adjacent to said head end, said connecting rod, wrist pin and piston being provided with openings which are in communication with each other and with said chamber in all positions of reciprocation of said piston and which are operative to conduct lubricant from said connecting rod into said chamber, said piston having a portion of the length of its side wall intermediate said piston ring groove and the remote end portion of the piston externally recessed relative to the end portions of said side wall, said piston being further provided with a plurality of passageways which extend outwardly from said chamber to said recessed side wall portion intermediate said groove and said remote end for conducting lubricant from said chamber to said recessed side wall portion, the outer ends of said plurality of passageways being spaced around the circumference of said piston so as to distribute the lubricant around the entire circumference of the piston side wall, and said side wall having an opening which extends from said recessed portion thereof to a surface portion thereof which is permanently exposed, thereby to constantly permit escape of lubricant from said recessed side wall portion.

References Cited in the file of this patent

UNITED STATES PATENTS

| | | |
|---|---|---|
| 1,800,077 | Jennings | Apr. 7, 1931 |
| 2,236,401 | Gehres | Mar. 25, 1941 |
| 2,240,640 | Ducate | May 6, 1941 |
| 2,446,348 | Webster | Aug. 3, 1948 |

FOREIGN PATENTS

| | | |
|---|---|---|
| 757,156 | France | Dec. 21, 1933 |